(12) United States Patent
Chaudhry

(10) Patent No.: US 6,775,121 B1
(45) Date of Patent: Aug. 10, 2004

(54) POWER LINE SURGE PROTECTION DEVICE

(75) Inventor: Nisar A. Chaudhry, Huntington Station, NY (US)

(73) Assignee: TII Network Technologies, Inc., Copiague, NY (US)

( * ) Notice: Subject to any disclaimer, the term of this patent is extended or adjusted under 35 U.S.C. 154(b) by 88 days.

(21) Appl. No.: 10/216,367

(22) Filed: Aug. 9, 2002

(51) Int. Cl.[7] ............................................. H02H 3/22
(52) U.S. Cl. ................................................... 361/111
(58) Field of Search ................................. 361/111, 119, 361/42, 56

(56) References Cited

U.S. PATENT DOCUMENTS

| | | |
|---|---|---|
| 4,212,047 A | 7/1980 | Napiorkowski |
| 4,438,477 A | 3/1984 | Cawley |
| 4,979,209 A | 12/1990 | Collins et al. |
| 5,099,212 A * | 3/1992 | Nagaishi ..................... 324/508 |
| 5,566,056 A | 10/1996 | Chaudhry |
| 5,790,363 A | 8/1998 | Chaudhry |
| 6,252,754 B1 | 6/2001 | Chaudhry |

* cited by examiner

Primary Examiner—Gregory J. Toatley, Jr.
Assistant Examiner—Boris Benenson
(74) Attorney, Agent, or Firm—Morgan & Finnegan, LLP

(57) ABSTRACT

Power line surge protection device comprising AC power line overvoltage protection, telephone voice line overvoltage and overcurrent protection, high speed data line overvoltage and overcurrent protection, coaxial transmission line overvoltage protection, and a ground-sensing indicator, all tied to a common ground.

27 Claims, 7 Drawing Sheets

POWER LINE SURGE PROTECTION DEVICE

BACKGROUND OF THE INVENTION

1. Field of the Invention

The present invention relates to an apparatus for protecting devices connected to AC power lines, telephone lines and/or networks which carry high speed digital signals using a common ground and a ground-sensing indicator.

2. Discussion of the Related Art

Today many homes use sensitive electronic devices as telecommuting and conducting business from one's home have become more commonplace. In addition to home entertainment centers with expensive audio/visual equipment, many homes now have personal computers, modems, printers, copiers, facsimile machines, telephone answering systems and home security systems. These sensitive electronic devices are connected to the outside world by means of telephone lines (both voice lines and high speed data lines), coaxial transmission lines (both cable TV and satellite dish antennas) and AC power lines.

Lightning is a major source of overvoltage conditions on residential wiring. An overvoltage condition can result from a direct lightning strike induced in AC transmission lines, cables, telephone lines or any conductive path by a nearby lightening strike, or it can be due to correction of the power factor (VI cosΘ) by electric utility companies when their capacitor banks are switched. It is estimated that there are over 90 million lightning bolts striking the United States annually generating innumerable induced voltage surges and millions of dollars in equipment loss. Each year thousands of homes and businesses are damaged or destroyed by lightning strikes and the surges they produce. For example, in 1990 residential claims for lightning damage exceeded one billion dollars. This number will inevitably increase as homeowners purchase more sophisticated electronics equipment.

Overvoltage conditions can also result from power line crosses caused, for example, by a vehicle striking a utility pole. Transients can also originate within the home when inductive loads such as electric motors are switched. Transients further result from switching non-inductive loads and can be induced on wiring in the home.

Overvoltage conditions can also result from the loss of AC neutral. The loss of AC neutral can result from corrosion of the meter pan at the service entrance where the meter is located outside the building and is exposed to the elements. If that occurs, devices that are normally connected to 110 to 120 volts AC are subjected to 220 to 240 volts AC. Most plug-in secondary surge suppressors in use today are not designed to withstand the loss of AC neutral and may create a fire hazard when AC neutral is lost.

Primary overvoltage protection for telephone lines is provided by surge arresters located in network interface devices ("NIDs") mounted on the outside of the home. See electrical protection devices 73 in FIG. 3 of U.S. Pat. No. 4,979,209 issued to Collins et at. on Dec. 19, 1990. Grounding for these overvoltage protection devices is provided by means of an earth ground brought into the enclosure at the time of installation and attached to ground bus 71 at terminal 71A.

Coaxial transmission lines have been used to carry signals requiring large bandwidth, such as analog video signals and very high speed digital signals. It is known in the prior art to protect coaxial transmission lines from overvoltage conditions using coaxial surge arrestors. One such coaxial surge arrestor is shown in U.S. Pat. No. 5,566,056 issued to Nisar A. Chaudhry on Oct. 15, 1996.

Overvoltage and overcurrent protection for high speed digital data lines requires different surge protection than that for standard voice telephone lines. Surge protection for high speed digital data lines must have low capacitance and low insertion loss to avoid attenuating the high speed data signals. Moreover, surge protection for high speed data lines must protect against both high voltage surges and low voltage surges. An Ethernet overvoltage and overcurrent protection system for 10BASE-T Ethernet and 100BASE-TX Fast Ethernet networks which does not significantly decrease the bandwidth of the networks is shown in U.S. Pat. No. 5,790,363 issued to Nisar A. Chaudhry on Aug. 4, 1998.

Many homeowners attempt to protect their valuable electronic equipment with plug-in surge suppressors. However, such devices do not protect equipment from the large amplitude pulses induced by lightning strikes, although they do offer some protection against low energy transients originating within the home. A surge suppressor is only as good as the ground to which it is connected. A plug-in surge suppressor which protects both AC power lines and telephone lines is shown in U.S. Pat. No. 4,438,477 issued to Cawley on Mar. 20, 1984.

Many plug-in surge suppressors do not have the ability to sense the presence of a ground connection. Thus, in the event of no ground connection, serious damage may occur to electronic equipment connected to the plug-in surge suppressor during surge activity.

Plug-in surge suppressors sold prior to 1998 had to meet the requirements of Underwriters Laboratories Standard 1449, First Edition ("UL 1449 Ed 1") dated Aug. 28, 1985. On Aug. 15, 1996 UL 1449 Second Edition ("UL 1449 Ed 2") was released and became effective Feb. 16, 1998. It requires new tests that were not required by UL 1449 Ed 1. For example, a new test that must be passed to qualify under UL 1449 Ed 2 is that a plug-in surge suppressor must not create a fire hazard in the event AC neutral is lost. Since UL 1449 Ed 2 was promulgated in August 1996, companies have been struggling to comply with the new test requirements.

SUMMARY OF THE INVENTION

The present invention provides a power line surge protection device which is more effective in protecting electronic equipment and human beings from the dangers associated with overvoltage conditions such as those induced by lightning, the loss of a ground connection, and the loss of AC neutral, and which meet the more stringent requirements of UL 1449 Ed 2.

The present invention significantly reduces the likelihood that a fire will result from an overvoltage condition or a component failure in a typical power line surge protection device.

The present invention also provides a common ground, which provides a necessary surge diversion path, and which serves as a ground potential equalizer for reducing any ground loop currents that may cause serious damage to electronic equipment connected thereto during surge activity.

The above advantages and features are of representative embodiments only, and are presented only to assist in understanding the invention. It should be understood that they are not to be considered limitations on the invention as defined by the claims, or limitations on equivalents to the claims. For instance, some of these advantages may seem mutually contradictory, in that they cannot be simultaneously implemented in a single embodiment. Similarly, some advantages are primarily applicable to one aspect of the invention. Thus, this summary of features and advantages should not be considered dispositive in determining equivalence. Additional features and advantages of the invention will become apparent in the following description, from the drawings, and from the claims.

DESCRIPTION OF THE PREFERRED EMBODIMENTS

Figure 1:
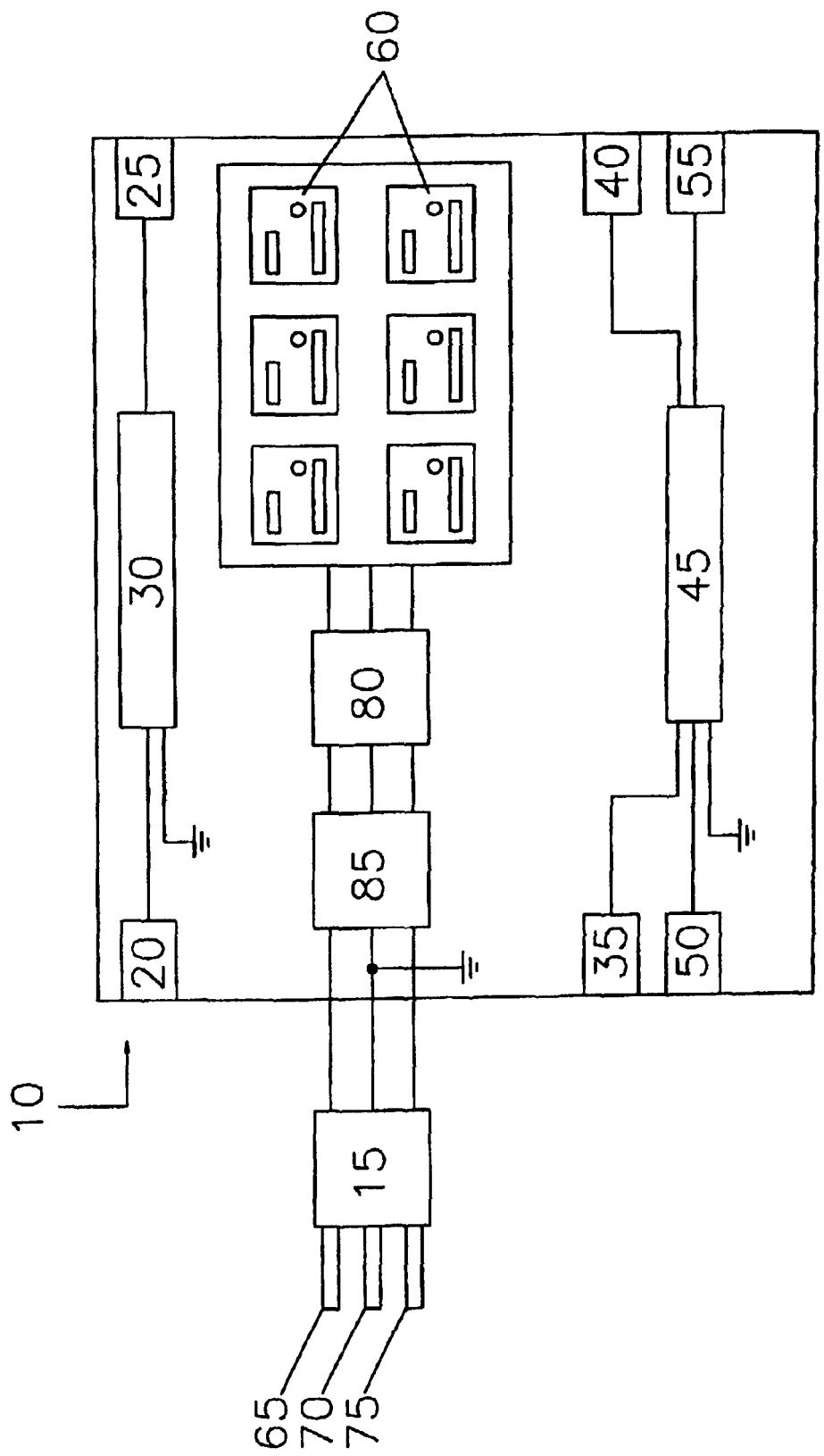
FIG. 1 is a schematic block diagram of a power line surge protection device in accordance with the present invention.

FIG. 1 is a schematic block diagram of power line surge protection device 10 according to the present invention. Power line surge protection device 10 comprises a three-prong male AC plug 15 which is adapted to plug into an AC outlet. It has three conductors: AC power line or AC line 65, AC neutral 75 and ground 70. Power line surge protection device 10 has RJ-11 jacks 20 and 25 to which a telephone voice line or FAX line may be connected. Between jacks 20 and 25 is an overvoltage and overcurrent protection circuit 30 which may take the form of the circuit shown in FIG. 3 which is described later. Power line surge protection device 10 also has Universal Serial Bus (USB) ports 35 and 40, and RJ-45 jacks 50 and 55 to which a high speed data line may be connected. Between USB ports 35 and 40, and RJ-45 jacks 50 and 55 is an overvoltage and overcurrent protection circuit which may take the form of the circuit shown in FIG. 2 which is described later. Power line surge protection device 10 also contains an AC overvoltage protection circuit 80 and multiple female AC outlets 60. The multiple female AC outlets 60 each contain a first, second, and third conductor for connecting to the first, second, and third conductors, respectively, of the AC plug 15. AC overvoltage protection circuit 80, which includes an operating indicator may take the form of the circuit shown in FIG. 5, which is described later. Power line surge protection device 10 additionally contains a ground-sensing indicator circuit 85 which may take the form of the circuit shown in FIG. 4, which is described later.

Figure 2:
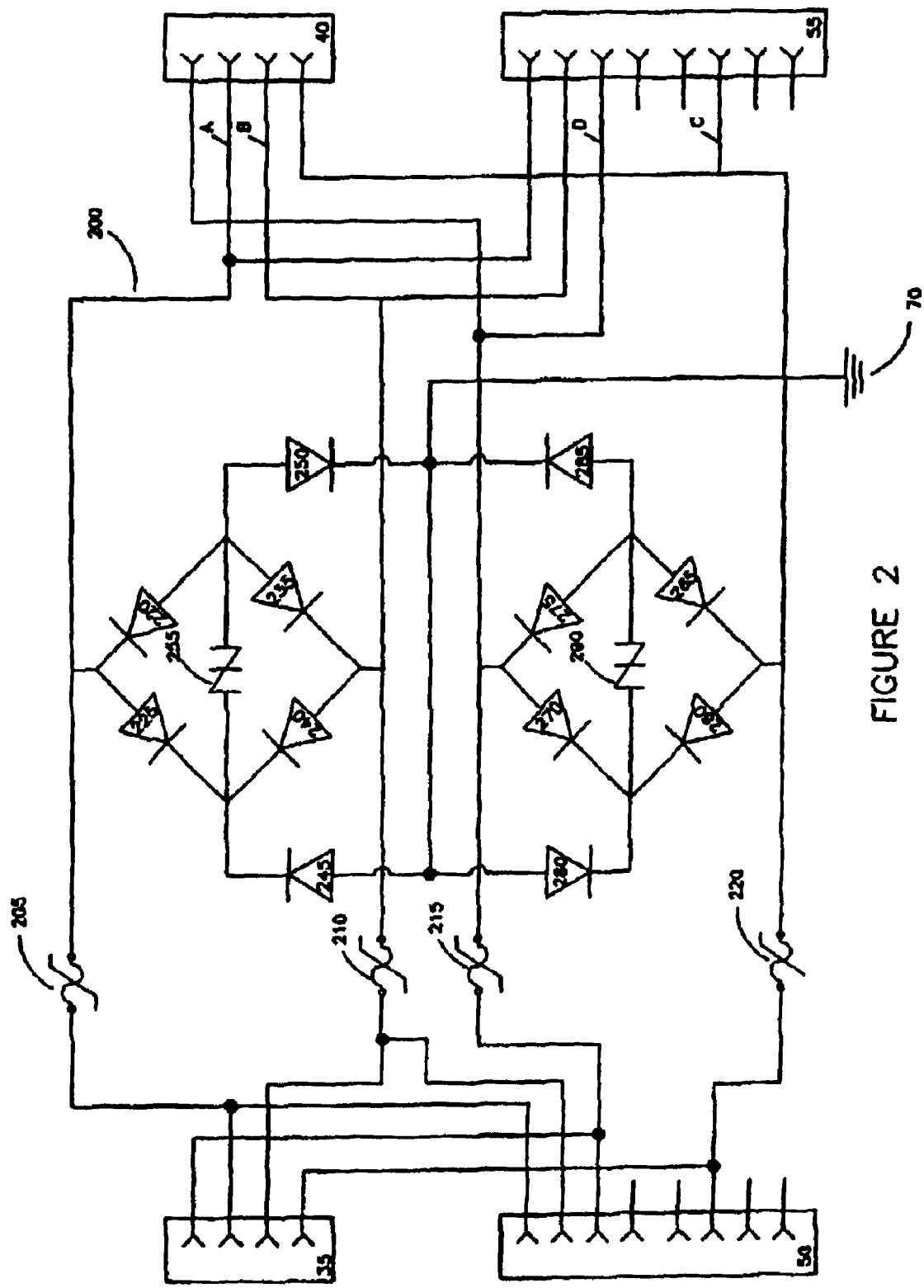
FIG. 2 is a schematic diagram of a high speed data line overvoltage and overcurrent protection circuit for use with the present invention.

FIG. 2 is a schematic diagram of a high speed data line overvoltage and overcurrent protection circuit 200 for a high speed digital network operating at 10BASE-T Ethernet or 100BASE-TX Fast Ethernet. Circuit 200 is connected between USB ports 35 and 40, and RJ-45 jacks 50 and 55. Circuit 200 provides both overvoltage protection as well as overcurrent protection. The overcurrent protection of circuit 200 is provided by fuses 205, 210, 215, and 220 which may be 250 volt, 350 milliampere fuses made by WICKMANN. In operation fuses 205, 210, 215, and 220 help circuit 200 to fuse open safely in case of dangerous power exposure to circuit 200 or electronic equipment connected thereto.

The overvoltage protection of circuit 200 includes diodes 225, 230, 235, 240, 245, 250, 260, 265, 270, 275, 280, 285, and thyristors 255 and 290. Diodes 225, 230, 235, 240, 245, and 250 form a first diode bridge and thyristor 255 is connected across the diode bridge. In addition, diodes 260, 265, 270, 275, 280, and 285 also form a second diode bridge and thyristor 290 is connected across the diode bridge. The first and second diode bridges are connected across the USB ports 35 and 40, and the RJ-45 jacks 50 and 55 carrying incoming digital signals. The first and second diode bridges limit the voltage coming from the USB ports 35 and 40, and the RJ-45 jacks 50 and 55 in the event that the voltage substantially exceeds, for example, normal digital signal levels. Diodes 225, 230, 235, 240, 260, 265, 270, and 275 may be type IN4007, 1 amp, 1000 volt PIV diodes. Diodes 245, 250, 280, and 285 may be type RL207, 2 amp, 1000 volt PIV diodes. Thyristors 255 and 290 may be SIDACtor® type made by Teccor Electronics and sold under part number P0300EC.

Thyristors 255 and 290 are used to protect circuit 200 from electrical disturbances caused by lightening induced surges, inductive coupled spikes, and AC power cross conditions. Using thyristors 255 and 290 provides, inter alia, several benefits: (1) thyristors 255 and 290 cannot be damaged by voltage, (2) thyristors 255 and 290 eliminate voltage overshoot caused by fast rising transients, and (3) thyristors 255 and 290 have low capacitance, making them ideal for high speed transmission equipment.

Excess positive voltages appearing at terminal A are clamped by diodes 250 and 225, and thyristor 255. Excess negative voltages appearing at terminal A are clamped by diodes 245 and 230, and thyristor 255. Excess positive voltages appearing at terminal B are clamped by diodes 240 and 250 and thyristor 255. Excess negative voltages appearing at terminal B are clamped by diodes 235 and 245, and thyristor 255. Excess positive voltages appearing at terminal C are clamped by diodes 260 and 285, and thyristor 290. Excess negative voltages appearing at terminal C are clamped by diodes 265 and 280, and thyristor 290. Excess positive voltages appearing at terminal D are clamped by diodes 270 and 285, and thyristor 290. Excess negative voltages appearing at terminal D are clamped by diodes 275 and 280, and thyristor 290.

The overvoltage protection of circuit 200 may further include two three-electrode gas tubes (not shown), one connected across the output side of fuses 205 and 210, and the other connected across the output side of fuses 215 and 220. The gas tubes conduct when the voltage on either sides of fuses 205, 210, 215, and 220, to which they are connected, exceeds a threshold value. The breakdown voltage may be between about 150 and about 300 volts, with a breakdown voltage on the order of 250 volts being preferred. A suitable three-electrode gas tube is shown in U.S. Pat. No. 4,212,047 issued to Napiorkowski on Jul. 8, 1980. Another suitable three-electrode gas tube is available from TII Industries, Inc., Copiague, N.Y. sold as TII 71 type or 73/75 type with a voltage breakdown range of 150–300 VDC.

Figure 3:
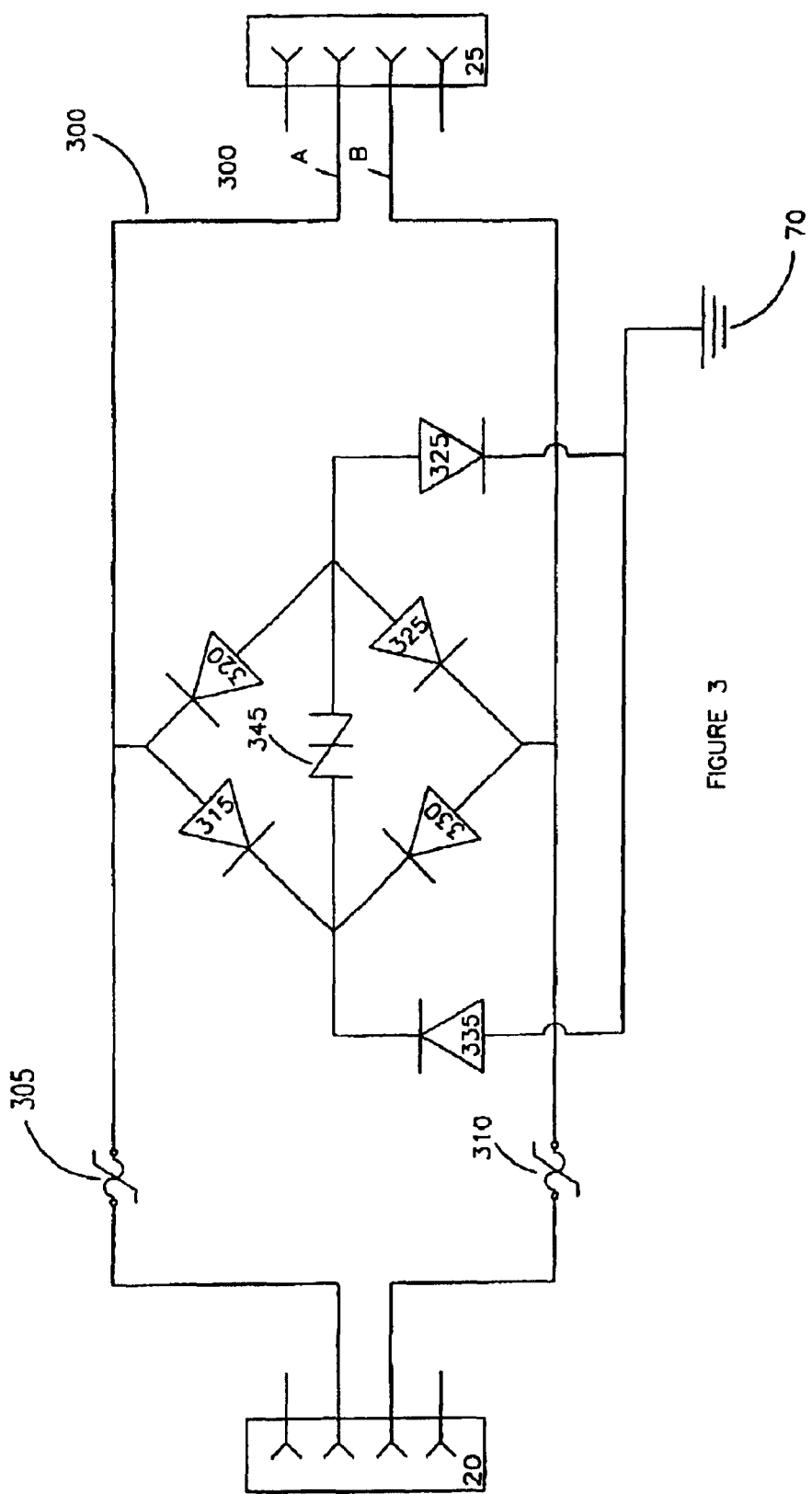
FIG. 3 is a schematic diagram of a telephone voice line overvoltage and overcurrent protection circuit for use with the present invention.

FIG. 3 is a schematic diagram of an overvoltage and overcurrent protection circuit 300 for a telephone voice line.

Circuit 300 is connected between RJ-11 jacks 20 and 25. Circuit 300 provides both overvoltage protection as well as overcurrent protection. The overcurrent protection of circuit 300 is provided by fuses 305 and 310 which may be 250 volt, 350 milliampere fuses made by WICKMANN. In operation fuses 305 and 310 help circuit 300 to fuse open safely in case of dangerous power exposure to circuit 300 or electronic equipment connected thereto.

The overvoltage protection of circuit 300 includes diodes 315, 320, 325, 330, 335, and 340 and thyristor 345. Diodes 315, 320, 325, 330, 335, and 340 form a diode bridge and thyristor 345 is connected across the diode bridge. The diode bridge is connected across the RJ-11 jacks 20 and 25 carrying incoming digital signals and limits the voltage coming from RJ-11 jacks 20 and 25 in the event that the voltage substantially exceeds, for example, normal digital signal levels. Diodes 315, 320, 325, and 330 may be type IN4007, 1 amp, 1000 volt PIV diodes. Diodes 335 and 340 may be type RL207, 2 amp, 1000 volt PIV diodes. Thyristor 345 may be SIDACtor® type made by Teccor Electronics and sold under part number P3100EC. Thyristor 345 is used to protect circuit 300 from electrical disturbances caused by lightening induced surges, inductive coupled spikes, and AC power cross conditions. It is to be understood that thyristor 345 provides the same or similar benefits as thyristors 255 and 290 described in relation to circuit 200 of FIG. 2.

Excess positive voltages appearing at terminal A are clamped by diodes 340 and 315, and thyristor 345. Excess negative voltages appearing at terminal A are clamped by diodes 335 and 320, and thyristor 345. Excess positive voltages appearing at terminal B are clamped by diodes 330 and 340 and thyristor 345. Excess negative voltages appearing at terminal B are clamped by diodes 325 and 335, and thyristor 345.

The overvoltage protection of circuit 300 may further include a three-electrode gas tube (not shown) connected across the output side of fuses 305 and 310. The gas tube conducts when the voltage on either sides of fuses 305 and 310 exceeds a threshold value. The breakdown voltage may be between about 150 and about 300 volts, with a breakdown voltage on the order of 250 volts being preferred. A suitable three-electrode gas tube is shown in U.S. Pat. No. 4,212,047 issued to Napiorkowski on Jul. 8, 1980. Another suitable three-electrode gas tube is available from TII Industries, Inc., Copiague, N.Y. sold as TII 71 type or 73/75 type with a voltage breakdown range of 150–300 VDC.

Figure 4:
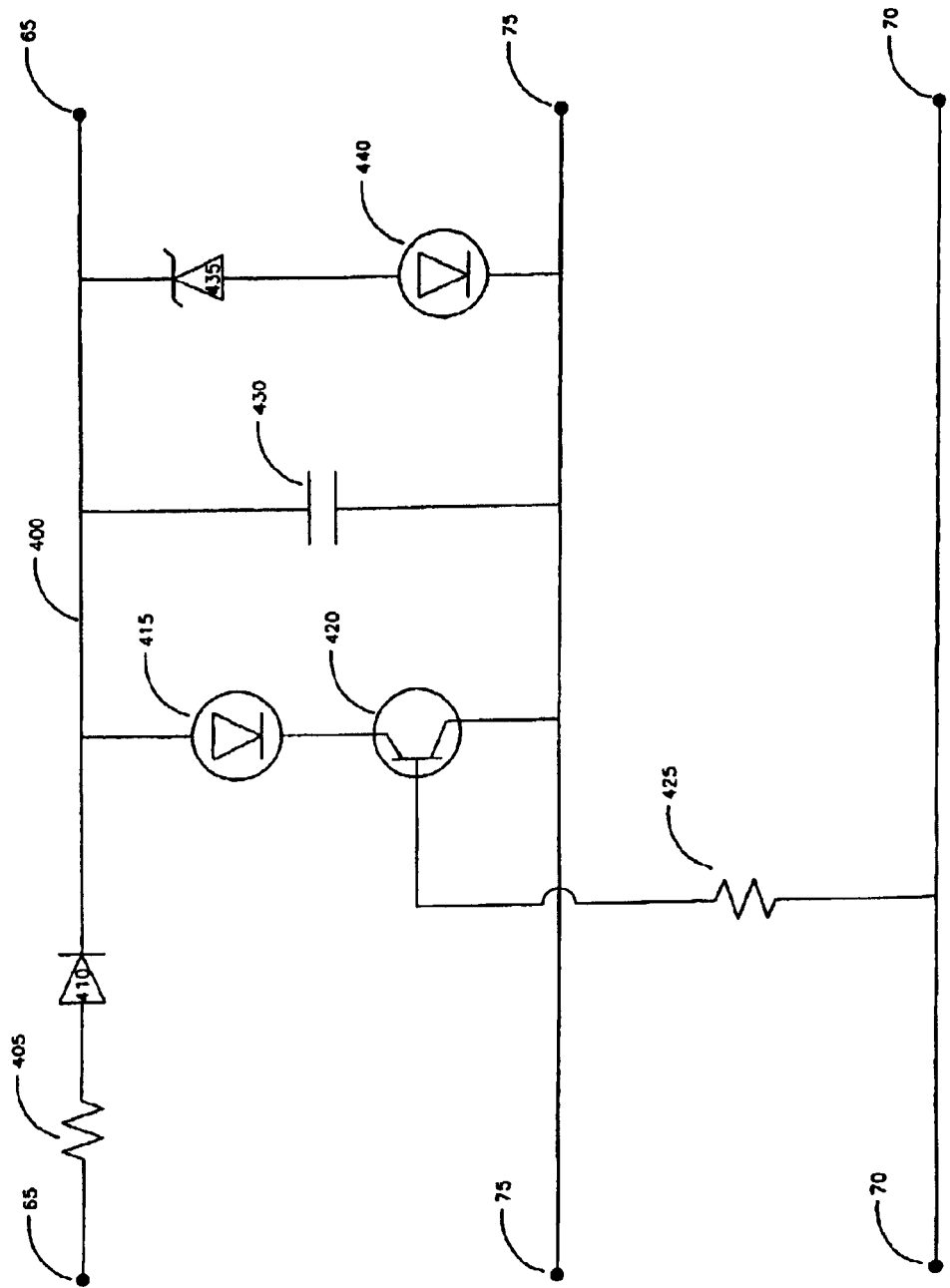
FIG. 4 is a schematic diagram of a ground-sensing indicator circuit for use with the present invention.

FIG. 4 is a schematic diagram of a ground-sensing indicator circuit 400 for sensing the presence of a ground connection and indicating whether or not the ground connection is lost when connected to circuits 30 and 45 as shown in FIG. 1. Circuit 400 is connected to: AC line 65, AC neutral 75 and ground 70. Circuit 400 includes a resistor 405 connected in series with AC line 65, and a resistor 425, which is connected in series with the ground 70. As shown in FIG. 4 diode 410 is connected in series with resistor 405 and with Green Light Emitting Diode (LED) 415. Circuit 400 also includes a transistor 420 which has a base, an emitter, and a collector. The emitter of transistor 420 is connected to the Green LED 415, the base is connected to the resistor 425, and the collector is connected to AC neutral 75. Circuit 400 additionally includes capacitor 430 connected to AC line 65 and AC neutral 75. In parallel with capacitor 430 is a zener diode 435, which is connected to AC line 65. A Red LED 440 is connected in series with zener diode 435 and AC neutral 75.

Resistor 405 may be a 10 kilo-ohm, 3 watt resistor, and resistor 425 may be a 620 kilo-ohm, ¼ watt resistor. Diode 410 may be type IN4007, 1 amp, 1000 volt PIV diodes. Zener diode 435 may be type IN4764, 100 volt, 1 watt diode. Capacitor may be a 0.22 micro-farads, 250 volt capacitor made by PANASONIC and sold under part number ECQ-E2224KF. Green LED 415 may be type 5400A5 and Red LED 440 may be type 5400A1. Transistor 420 may be type MPSA92, PNP high-voltage transistor.

Circuit 400 may be in direct communication with circuit 200, circuit 300, and an AC overvoltage protection circuit 500, which is described later with reference to FIG. 5. When the power line surge protection device 10 is plugged into an AC outlet the circuit 400 monitors the presence of a common ground connection continuously. If the ground connection is lost circuit 400 alerts a user by illuminating the Red LED 440 (i.e., indicating a negative presence of the ground connection). In contrast, if the ground connection is present circuit 400 alerts a user by illuminating the Green LED 415 (i.e., indicating a positive presence of the ground connection). In turn, this enables a user to have a sufficient level of confidence that the ground connection is present and that the power line surge protection device 10 will provide a suitable energy diversion path. In the event of no ground presence, any surge voltage between the connectors of circuits 200 and 300 will have a maximum clamping voltage of less than 40 volts during the surge activity because of the diode bridges described in FIGS. 2 and 3.

Figure 5:
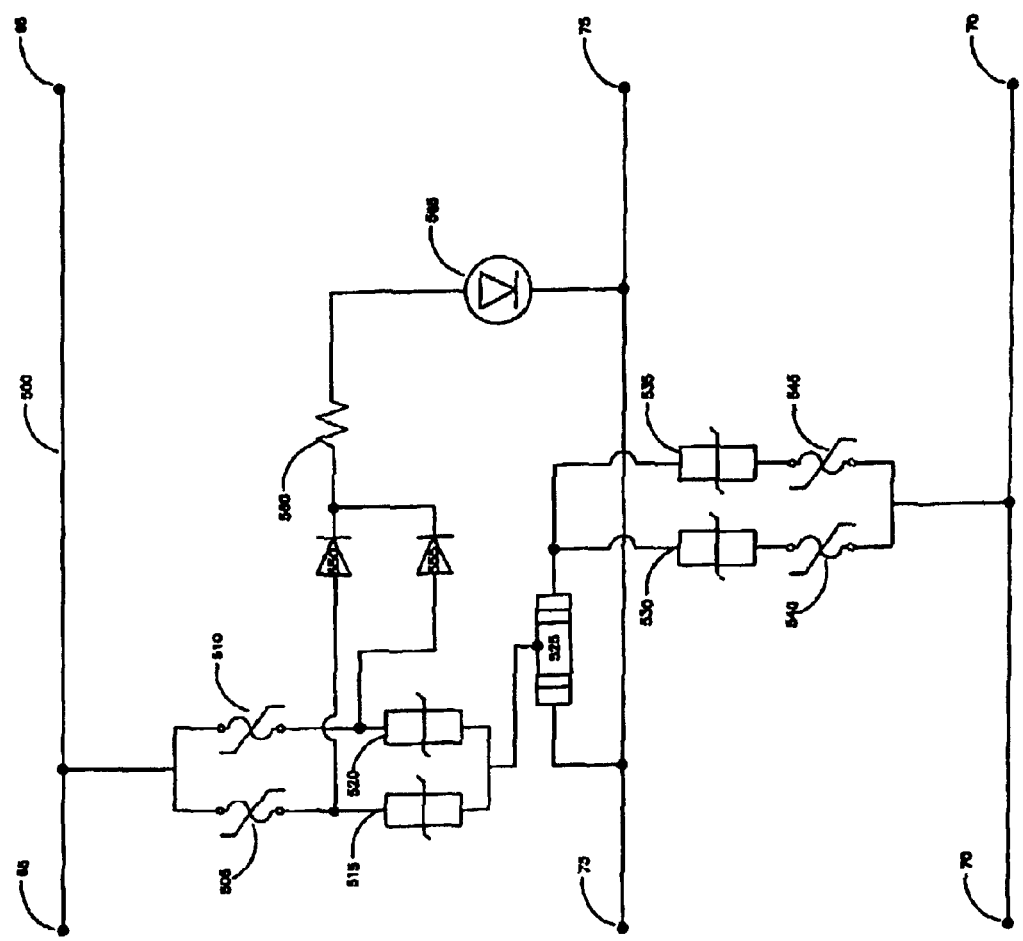
FIG. 5 is a schematic diagram of an AC protection circuit with an operating indicator for use with the present invention.

FIG. 5 is a schematic diagram of an AC overvoltage protection circuit 500. Circuit 500 employs thermal fuses 505 and 510 connected in series with AC line 65 and thermal fuses 540 and 545 connected in series with ground 70. Suitable thermal fuses are available as Microtemp Thermal Cutoffs made by Thermodisc, Incorporated, 1320 South Main Street, Mansfield, Ohio, 44907-0538 under part number RVLU 84C. Fuses 505, 510, 540, and 545 will fuse open when excessive heat is generated within a module housing the AC overvoltage protection circuit 500. Metal Oxide Varistors (MOVS) 515 and 520 are connected between AC line 65 and one electrode of gas tube 525. MOVs 530 and 535 are connected between AC neutral 75 and one electrode of gas tube 525. MOVs 515, 520, 530, and 535 may be a 95 volt device which is available from Maida Development Company, under part number D6521Z0950RA65. Gas tube 525 may be an TII 11B gas tube which is available from TII Industries, Inc., Copiague, N.Y. and has a breakdown voltage in the range of 300 to 500 volts. Fuses 505, 510, 540, and 545 are located in close physical proximity to the MOVs 515, 520, 530, and 535 and the gas tube 525.

Circuit 500 also includes a diode 550 connected between thermal fuse 505 and MOV 515. In parallel with diode 550 is a diode 555, which is connected between thermal fuse 510 and MOV 520. Diodes 550 and 555 may be type IN4007, 1 amp, 1000 volt PIV diodes. Connected in series to diodes 550 and 555 is resistor 560, which may be a 10 kilo-ohm, 3 watt resistor. Connected to resistor 560 in series is a Green LED 565, which may be type 5400A5. In operation Green LED 565 is illuminated to indicate to a user that circuit 500 is operating properly. Thus, if Green LED 565 is not illuminated circuit 500 is not operating properly.

Circuit 500 as shown in FIG. 5 has been tested and meets the requirements of UL 1449 Ed 2. The MOVs 515 and 520 between AC line 65 and gas tube 525 and the MOVs 530 and 535 between ground 70 and the gas tube 525 ensure that the gas tube 525 will turn off after a voltage surge has caused the gas tube 525 to turn on. Also, the fact that gas tube 525 is in series with MOVs 515, 520, 530, and 535 connected to ground 70 and AC line 65 ensures that there will be only a very small leakage current through MOVs 515, 520, 530, 535 in the absence of a voltage surge sufficient to cause the gas tube 525 to conduct.

In an alternative embodiment circuit 500 may also be one of the AC overvoltage protection circuits described in U.S. Pat. No. 6,252,754 issued to Nisar A. Chaudhry on Jun. 26, 2001, a copy of which is incorporated herein by reference.

Figure 6:
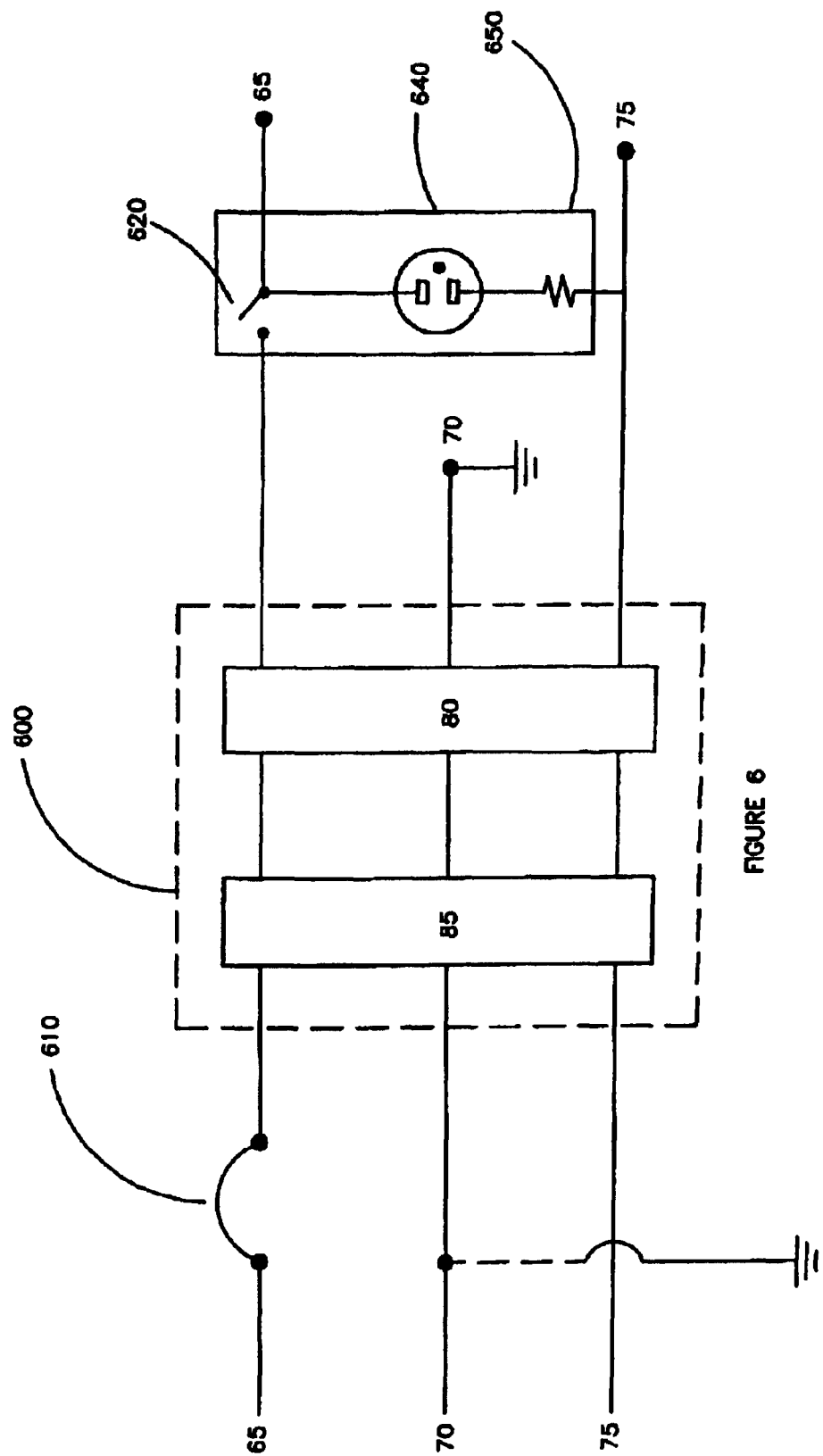
FIG. 6 is a schematic block diagram of an AC surge suppression board for use with the present invention.

FIG. 6 is a schematic diagram of an AC surge suppression board 600. AC surge suppression board 600 includes ground-sensing indicator circuit 400 and AC overvoltage protection circuit 500 which are described above with reference to FIGS. 4 and 5, respectively. The input of AC surge suppression board is connected to a circuit breaker 610, which is in series with AC line 65. The output of AC surge suppression board is connected to an ON/OFF switch 620. ON/OFF switch 620 is connected between AC line 65 and AC neutral 75. ON/OFF switch 620 includes a single pole, single throw AC switch 630, a neon lamp 640 and a resistor 650. ON/OFF switch 620 may be a Rocker Switch, which is available from Rong Feng Industrial Co., Ltd., under part number RF-1001.

Figure 7:
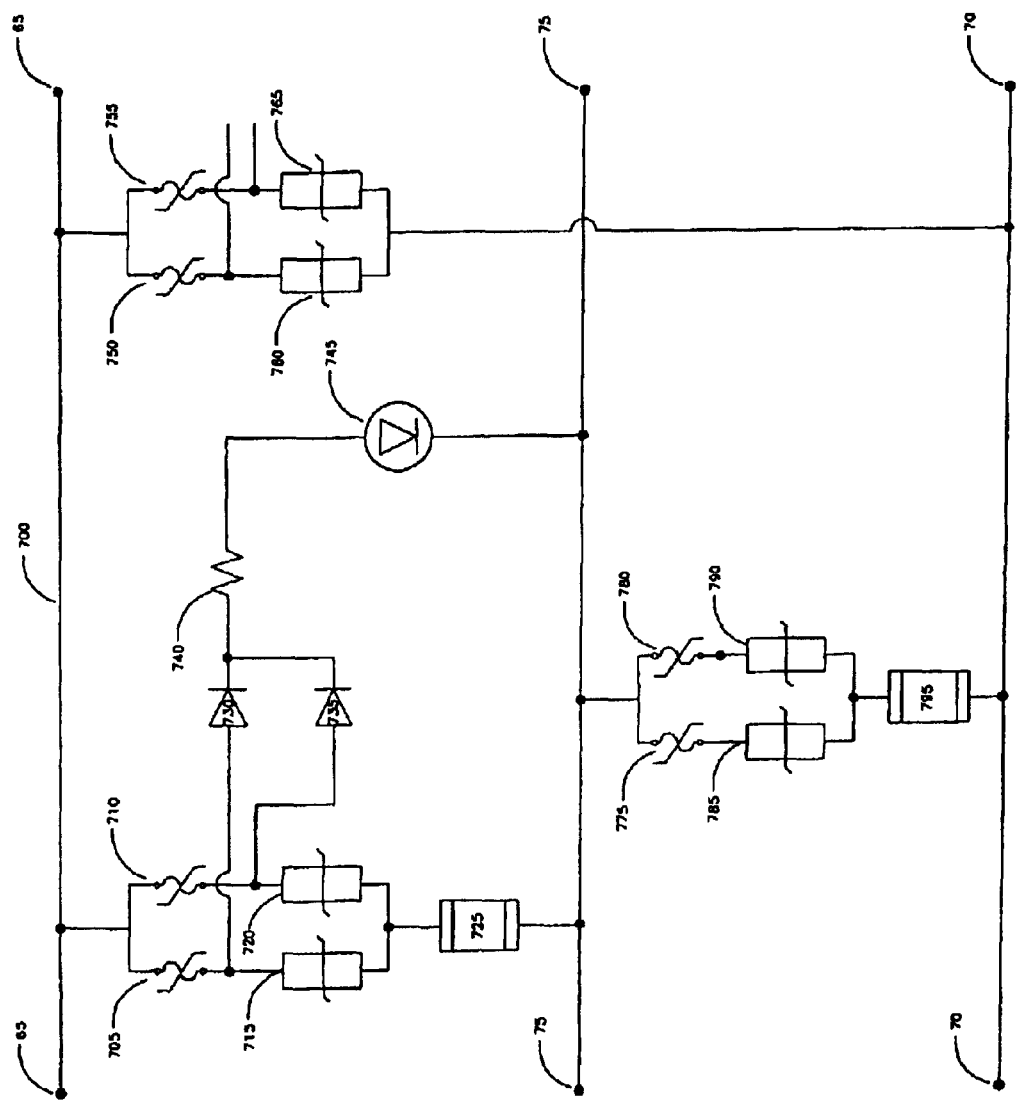
FIG. 7 is a schematic diagram of an alternative AC protection circuit with an operating indicator for use with the present invention.

FIG. 7 is a schematic diagram of an alternative AC overvoltage protection circuit 700. Circuit 700 employs thermal fuses 705, 710, 750, and 755 connected in series with AC line 65 and thermal fuses 775 and 780 connected in series with AC neutral 75. Suitable thermal fuses are available as Microtemp Thermal Cutoffs made by Thermodisc, Incorporated, 1320 South Main Street, Mansfield, Ohio, 44907-0538 under part number RVLU 84C. Fuses 705, 710, 750, 755, 775, and 780 will fuse open when excessive heat is generated within a module housing the AC overvoltage protection circuit 700. MOVs 715 and 720 are connected between AC line 65 and one electrode of gas tube 725. MOVs 760 and 765 are connected between AC line 65 and one electrode of gas tube 770. MOVs 785 and 790 are connected between AC neutral 75 and one electrode of gas tube 795. MOVs 715,720, 760, 765, 785, and 790 may be a 95 volt device which is available from Maida Development Company, under part number D6521Z0950RA65. Gas tubes 725, 770, and 795 may be two-electrode gas tubes, which are available from TII Industries, Inc. Copiague, N.Y. and have a breakdown voltage of in the range of 300–500 volts.

Circuit 700 also includes a diode 730 connected between thermal fuse 705 and MOV 715. In parallel with diode 730 is a diode 735, which is connected between thermal fuse 710 and MOV 720. Diodes 730 and 735 may be type IN4007, 1 amp, 1000 volt PIV diodes. Connected in series to diodes 730 and 735 is resistor 740, which may be a 10 kilo-ohm, 3 watt resistor. Connected to resistor 740 in series is a Green LED 745, which may be type 5400A5. In operation Green LED 745 is illuminated to indicate to a user that circuit 700 is operating properly. Thus, if Green LED 745 is not illuminated circuit 700 is not operating properly.

In an alternative embodiment power line surge protection device 10 may also include F-type coaxial connectors to which a coaxial transmission line may be connected. Between the F-type connectors may be a coaxial surge arrestor described in U.S. Pat. No. 5,566,056 issued to Nisar A. Chaudhry on Oct. 15, 1996 a copy of which is incorporated herein by reference.

It should be understood that the above description is only representative of illustrative embodiments. For the convenience of the reader, the above description has focused on a representative sample of possible embodiments, a sample that is illustrative of the principles of the present invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. Other applications and embodiments can be conceived by those without departing from the spirit and scope of the present invention. It is therefore intended, that the invention is not to be limited to the disclosed embodiments but is to be defined in accordance with the claims that follow. It can be appreciated that many of those undescribed embodiments are within the scope of the following claims, and others are equivalent.

What is claimed is:

1. A power line surge protection device comprising:
    an AC plug comprising a first conductor for connection to an AC line, a second conductor for connection to an AC neutral, and a third conductor for connection to a ground;
    at least one female outlet, each outlet comprising a first, a second, and a third conductor connected, respectively, to the first, the second, and the third conductors of the AC plug;
    an overvoltage protection circuit, the circuit comprising:
        at least one temperature sensing fuse connected in series with the AC line;
        at least one temperature sensing fuse connected in series with the ground;
        a three electrode gas tube connected to the AC neutral;
        at least one metal oxide varistor (MOV) connected between at least one temperature sensing fuse connected in series with the AC line and the three electrode gas tube;
        at least one MOV connected between at least one temperature sensing fuse connected in series with ground, and the three electrode gas tube;
        at least one diode connected between at least one temperature sensing fuse connected in series with the AC line and at least one MOV connected between at least one temperature sensing fuse connected in series with the AC line and the three electrode gas tube;
        a first resistor connected in series with at least one diode; and
        a first indicator connected between the first resistor and the AC neutral;
    a ground-sensing indicator circuit, the circuit comprising:
        a second resistor connected in series with the AC line;
        a diode connected in series with the second resistor;
        a transistor including a base, an emitter, and a collector, the collector connected to the AC neutral;
        a second indicator device connected between the diode and the emitter of the transistor;
        a third resistor connected between the ground and the base of the transistor;
        a capacitor connected between the AC line and the AC neutral;
        a zener diode connected in series with the AC line; and
        a third indicator device connected between the zener diode and the AC neutral.

2. The power line surge protection device of claim 1, wherein said first, second, and third indicator devices are each light emitting diodes.

3. The power line surge protection device of claim 2, wherein said first and second indicator devices are each green light emitting diodes, and said third indicator device is a red light emitting diode.

4. A high speed data line overvoltage and overcurrent protection circuit incorporating a ground-sensing indicator circuit, comprising:

a high speed data line overvoltage and overcurrent protection circuit, the circuit comprising:
a first overvoltage and overcurrent protection circuit comprising an overvoltage protection section, and an overcurrent protection section;
the overcurrent protection section of the first overvoltage and overcurrent protection circuit comprising at least one fuse connected between a connector carrying incoming digital signals and a connector carrying outgoing digital signals; and
the overvoltage protection circuit of the first overvoltage and overcurrent protection circuit comprising a diode bridge comprising a first, a second, a third, a fourth, a fifth, and a sixth diode and a first thyristor; and
a second overvoltage and overcurrent protection circuit comprising an overvoltage protection section, and an overcurrent protection section;
the overcurrent protection section of the second overvoltage and overcurrent protection circuit comprising at least one fuse connected between a connector carrying incoming digital signals and a connector carrying outgoing digital signals; and
the overvoltage protection circuit of the second overvoltage and overcurrent protection circuit comprising a diode bridge comprising a seventh, an eighth, a ninth, a tenth, an eleventh, and a twelfth diode and a second thyristor; and
a ground-sensing indicator circuit, the circuit comprising:
a first resistor connected in series with the AC line;
a diode connected in series with the first resistor;
a transistor including a base, an emitter, and a collector, the collector connected to the AC neutral;
a first indicator device connected between the diode and the emitter of the transistor;
a second resistor connected between the ground and the base of the transmitter;
a capacitor connected between the AC line and the AC neutral;
a zener diode connected in series with the AC line; and
a second indicator device connected between the zener diode and the AC neutral.

5. The power line surge protection device of claim 4, wherein said first and second indicator devices are each light emitting diodes.

6. The power line surge protection device, of claim 5 wherein said first indicator device is a green light emitting diode, and said second indicator device is a red light emitting diode.

7. A power line surge protection device, comprising:
an AC plug adapted to be plugged into an AC outlet, the AC plug comprising a first conductor for connection to an AC line, a second conductor for connection to an AC neutral, and a third conductor for connection to a ground;
at least one female outlet, each outlet comprising a first, a second, and a third conductor connected, respectively, to the first, the second, and the third conductors of the AC plug;
an overvoltage protection circuit for protecting the AC line from overvoltage conditions, the circuit comprising:
a first temperature sensing fuse connected in series with the AC line;
a second temperature sensing fuse connected in series with the AC line;
a first temperature sensing fuse connected in series with the ground;
a second temperature sensing fuse connected in series with the ground;
a three electrode gas tube, a first electrode being connected to the AC neutral;
a first metal oxide varistor (MOV), one side of the first MOV being connected to the first temperature sensing fuse connected in series with the AC line, and the other side being connected to a second electrode of the three electrode gas tube;
a second MOV, one side of the second MOV being connected to the second temperature sensing fuse connected in series with the AC line, and the other side being connected to a second electrode of the three electrode gas tube;
a third MOV, one side of the third MOV being connected to the first temperature sensing fuse connected in series with ground, and the other side being connected to a third electrode of the three electrode gas tube;
a fourth MOV, one side of the fourth MOV being connected to the second temperature sensing fuse connected in series with ground, and the other side being connected to a third electrode of the three electrode gas tube;
a first diode, one side of the first diode being connected between the first MOV and the first temperature sensing fuse connected in series with the AC line;
a second diode, one side of the second diode being connected between the second MOV and the second temperature sensing fuse connected in series with the AC line;
a first resistor, one side of the first resistor being connected in series with the first and second diodes; and
a first indicator device, one side of the first indicator device being connected in series with the first resistor and the other side being connected in series with the AC neutral;
a ground-sensing indicator circuit for indicating the presence of a ground connection, the circuit comprising:
a second resistor connected in series with the AC line;
a diode connected in series with the second resistor;
a transistor including a base, an emitter, and a collector, the collector being connected to the AC neutral;
a second indicator device, one side of the second indicator device being connected to the diode, and the other side being connected to the emitter of the transistor;
a third resistor, one side of the third resistor being connected to the ground, and the other side being connected to the base of the transmitter;
a capacitor, one side of the capacitor being connected to the AC line, and the other side being connected to the AC neutral;
a zener diode being connected in series with the AC line; and
a third indicator device, one side of the third indicator device being connected to the zener diode, and the other side being connected to the AC neutral.

8. The power line surge protection device of claim 7, further comprising:
a high speed data line overvoltage and overcurrent protection circuit for protecting the high speed data line from overvoltage and overcurrent conditions, the circuit comprising:
a first overvoltage and overcurrent protection circuit adapted to be connected in series with a connector carrying incoming digital signals and a connector carrying outgoing digital signals, the first overvoltage and overcurrent protection circuit comprising an overvoltage protection section, and an overcurrent protection section;

the overcurrent protection section of the first overvoltage and overcurrent protection circuit comprising a first and a second fuse, the first side of the first fuse being connected to the connector carrying incoming digital signals and the first side of the second fuse being connected to the connector carrying incoming digital signals; and the overvoltage protection circuit of the first overvoltage and overcurrent protection circuit comprising a diode bridge comprising a first, a second, a third, a fourth, a fifth, and a sixth diode and a first thyristor, the anode of the first diode being connected to the cathode of the second diode and to the second side of the first fuse, the cathode of the third diode being connected to the anode of the fourth diode and to the second side of the second fuse, the cathode of the first diode being connected to the cathode of the fourth diode, which is connected to the first side of the first thyristor and to the cathode of the fifth diode, the anode of the second diode being connected to the anode of the third diode, which is connected to the second side of the first thyristor and to the anode of the sixth diode, the anode of the fifth diode and the cathode of the sixth diode being connected to the ground; and a second overvoltage and overcurrent protection circuit adapted to be connected in series with a connector carrying incoming digital signals and a connector carrying outgoing digital signals, the second overvoltage and overcurrent protection circuit comprising an overvoltage protection section, and an overcurrent protection section;

the overcurrent protection section of the second overvoltage and overcurrent protection circuit comprising a third and a fourth fuse, the first side of the third fuse being connected to the connector carrying incoming digital signals and the first side of the fourth fuse being connected to the connector carrying incoming digital signals; and the overvoltage protection circuit of the second overvoltage and overcurrent protection circuit comprising a diode bridge comprising a seventh, an eighth, a ninth, a tenth, an eleventh, and a twelfth diode and a second thyristor, the anode of the seventh diode being connected to the cathode of the eighth diode and to the second side of the third fuse, the cathode of the ninth diode being connected to the anode of the tenth diode and to the second side of the fourth fuse, the cathode of the seventh diode being connected to the cathode of the tenth diode, which is connected to the first side of the second thyristor and to the cathode of the eleventh diode, the anode of the eighth diode being connected to the anode of the ninth diode, which is connected to the second side of the second thyristor and to the anode of the twelfth diode, the anode of the eleventh diode and the cathode of the twelfth diode being connected to the ground.

9. The power line surge protection device of claim 8, wherein the connector is a Universal Serial Bus (USB) port or an RJ-45 jack.

10. The power line surge protection device of claim 9, further comprising:
a coaxial surge arrestor being connected in series with a coaxial transmission line and the ground for protecting the coaxial transmission line from overvoltage conditions.

11. The power line surge protection device of claim 9, further comprising:
a circuit breaker being connected in series with the AC plug and the ground-sensing indicator for protecting from overcurrent conditions.

12. The power line surge protection device of claim 7, further comprising:
a telephone line overvoltage and overcurrent protection circuit for protecting the telephone line from overvoltage and overcurrent conditions, the circuit comprising:
a first overvoltage and overcurrent protection circuit adapted to be connected in series with a connector carrying incoming digital signals and a connector carrying outgoing digital signals, the first overvoltage and overcurrent protection circuit comprising an overvoltage protection section, and an overcurrent protection section;

the overcurrent protection section of the first overvoltage and overcurrent protection circuit comprising a first and a second fuse, the first side of the first fuse being connected to the connector carrying incoming digital signals and the first side of the second fuse being connected to the connector carrying incoming digital signals; and the overvoltage protection circuit of the first overvoltage and overcurrent protection circuit comprising a diode bridge comprising a first, a second, a third, a fourth, a fifth, and a sixth diode and a first thyristor, the anode of the first diode being connected to the cathode of the second diode and to the second side of the first fuse, the cathode of the third diode being connected to the anode of the fourth diode and to the second side of the second fuse, the cathode of the first diode being connected to the cathode of the fourth diode, which is connected to the first side of the first thyristor and to the cathode of the fifth diode, the anode of the second diode being connected to the anode of the third diode, which is connected to the second side of the first thyristor and to the anode of the sixth diode, the anode of the fifth diode and the cathode of the sixth diode being connected to the ground.

13. The power line surge protection device of claim 12, wherein the connector is an RJ-11.

14. The power line surge protection device of claim 7, wherein the first indicator device indicates positive operation of the overvoltage protection circuit for protecting the AC line.

15. The power line surge protection device of claim 7, wherein the second indicator device indicates positive presence of the ground connection.

16. The power line surge protection device of claim 7, wherein the third indicator device indicates negative presence of the ground connection.

17. The power line surge protection device of claim 7, wherein said first, second, and third indicator devices are each light emitting diodes.

18. The power line surge protection device of claim 17, wherein said first and second indicator devices are each green light emitting diodes, and said third indicator device is a red light emitting diode.

19. A high speed data line overvoltage and overcurrent protection circuit incorporating a ground-sensing indicator circuit, comprising:
a high speed data line overvoltage and overcurrent protection circuit for protecting the high speed data line from overvoltage and overcurrent conditions, the circuit comprising:
a first overvoltage and overcurrent protection circuit adapted to be connected in series with a connector carrying incoming digital signals and a connector carrying outgoing digital signals, the first overvoltage and overcurrent protection circuit comprising an overvoltage protection section, and an overcurrent protection section;
the overcurrent protection section of the first overvoltage and overcurrent protection circuit comprising a first and a second fuse, the first side of the first fuse being connected to the connector carrying incoming digital signals and the first side of the second fuse being connected to the connector carrying incoming digital signals; and
the overvoltage protection circuit of the first overvoltage and overcurrent protection circuit comprising a diode bridge comprising a first, a second, a third, a fourth, a fifth, and a sixth diode and a first thyristor, the anode of the first diode being connected to the cathode of the second diode and to the second side of the first fuse, the cathode of the third diode being connected to the anode of the fourth diode and to the second side of the second fuse, the cathode of the first diode being connected to the cathode of the fourth diode, which is connected to the first side of the first thyristor and to the cathode of the fifth diode, the anode of the second diode being connected to the anode of the third diode, which is connected to the second side of the first thyristor and to the anode of the sixth diode, the anode of the fifth diode and the cathode of the sixth diode being connected to the ground; and
a second overvoltage and overcurrent protection circuit adapted to be connected in series with a connector carrying incoming digital signals and a connector carrying outgoing digital signals, the second overvoltage and overcurrent protection circuit comprising an overvoltage protection section, and an overcurrent protection section;
the overcurrent protection section of the second overvoltage and overcurrent protection circuit comprising a third and a fourth fuse, the first side of the third fuse being connected to the connector carrying incoming digital signals and the first side of the fourth fuse being connected to the connector carrying incoming digital signals; and
the overvoltage protection circuit of the second overvoltage and overcurrent protection circuit comprising a diode bridge comprising a seventh, an eighth, a ninth, a tenth, an eleventh, and a twelfth diode and a second thyristor, the anode of the seventh diode being connected to the cathode of the eighth diode and to the second side of the third fuse, the cathode of the ninth diode being connected to the anode of the tenth diode and to the second side of the fourth fuse, the cathode of the seventh diode being connected to the cathode of the tenth diode, which is connected to the first side of the second thyristor and to the cathode of the eleventh diode, the anode of the eighth diode being connected to the anode of the ninth diode, which is connected to the second side of the second thyristor and to the anode of the twelfth diode, the anode of the eleventh diode and the cathode of the twelfth diode being connected to the ground; and a ground-sensing indicator circuit for indicating the presence of the ground connection, the circuit comprising:
a first resistor adapted to be connected in series with the AC line;
a diode connected in series with the first resistor;
a transistor including a base, an emitter, and a collector, the collector adapted to be connected to the AC neutral;
a first indicator device, one side of the first indicator device being connected to the diode, and the other side being connected to the emitter of the transistor;
a second resistor, one side of the second resistor being connected to the ground, and the other side being connected to the base of the transmitter;
a capacitor, one side of the capacitor adapted to be connected to the AC line, and the other side adapted to be connected to the AC neutral;
a zener diode adapted to be connected in series with the AC line; and
a second indicator device, one side of the second indicator device being connected to the zener diode, and the other side adapted to be connected to the AC neutral.

20. The high speed data line overvoltage and overcurrent protection circuit of claim 19, wherein the connector is a Universal Serial Bus (USB) port or an RJ-45 jack.

21. The high speed data line overvoltage and overcurrent protection circuit of claim 9, wherein the first indicator device indicates positive presence of the ground connection.

22. The high speed data line overvoltage and overcurrent protection circuit of claim 19, wherein the second indicator device indicates negative presence of the ground connection.

23. The high speed data line overvoltage and overcurrent protection circuit of claim 19, wherein said first and second indicator devices are each light emitting diodes.

24. The high speed data line overvoltage and overcurrent protection circuit of claim 23, wherein said first indicator device is a green light emitting diode, and said second indicator device is a red light emitting diode.

25. A power line surge protection device, comprising:
an AC plug adapted to be plugged into an AC outlet, the AC plug comprising a first conductor for connection to an AC line, a second conductor for connection to an AC neutral, and a third conductor for connection to a ground;
at least one female outlet, each outlet comprising a first, a second, and a third conductor connected, respectively, to the first, the second, and the third conductors of the AC plug;
an overvoltage protection circuit for protecting the AC line from overvoltage conditions, the circuit comprising:
a first temperature sensing fuse connected in series with the AC line;
a second temperature sensing fuse connected in series with the AC line;
a third temperature sensing fuse connected in series with the AC line;
a fourth temperature sensing fuse connected in series with the AC line;

a first temperature sensing fuse connected in series with the AC neutral;

a second temperature sensing fuse connected in series with the AC neutral;

a first two electrode gas tube, a first electrode being connected to the AC neutral;

a second two electrode gas tube, a first electrode being connected to the ground;

a third two electrode gas tube, a first electrode being connected to the ground;

a first metal oxide varistor (MOV), one side of the first MOV being connected to the first temperature sensing fuse connected in series with the AC line, and the other side being connected to a second electrode of the first two electrode gas tube;

a second MOV, one side of the second MOV being connected to the second temperature sensing fuse connected in series with the AC line, and the other side being connected to the second electrode of the first two electrode gas tube;

a third MOV, one side of the third MOV being connected to the third temperature sensing fuse connected in series with the AC line, and the other side being connected to a third electrode of the second two electrode gas tube;

a fourth MOV, one side of the fourth MOV being connected to the fourth temperature sensing fuse connected in series with the AC line, and the other side being connected to the second electrode of the second two electrode gas tube;

a fifth MOV, one side of the first MOV being connected to the first temperature sensing fuse connected in series with the AC neutral, and the other side being connected to a second electrode of the third two electrode gas tube;

a sixth MOV, one side of the sixth MOV being connected to the second temperature sensing fuse connected in series with the AC neutral, and the other side being connected to a second electrode of the third two electrode gas tube;

a first diode, one side of the first diode being connected between the first MOV and the first temperature sensing fuse connected in series with the AC line;

a second diode, one side of the second diode being connected between the second MOV and the second temperature sensing fuse connected in series with the AC line;

a first resistor, one side of the first resistor being connected in series with the first and second diodes; and a first indicator device, one side of the first indicator device being connected in series with the first resistor and the other side being connected in series with the AC neutral;

a ground-sensing indicator circuit for indicating the presence of a ground connection, the circuit comprising:

a second resistor connected in series with the AC line;

a diode connected in series with the second resistor;

a transistor including a base, an emitter, and a collector, the collector being connected to the AC neutral;

a second indicator device, one side of the second indicator device being connected to the diode, and the other side being connected to the emitter of the transistor;

a third resistor, one side of the third resistor being connected to the ground, and the other side being connected to the base of the transmitter;

a capacitor, one side of the capacitor being connected to the AC line, and the other side being connected to the AC neutral;

a zener diode being connected in series with the AC line; and a third indicator device, one side of the third indicator device being connected to the zener diode, and the other side being connected to the AC neutral.

26. The power line surge protection device of claim 25, wherein said first, second, and third indicator devices are each light emitting diodes.

27. The power line surge protection device of claim 26, wherein said first and second indicator devices are each green light emitting diodes, and said third indicator device is a red light emitting diode.

* * * * *